(12) United States Patent
Nihei et al.

(10) Patent No.: US 6,928,355 B2
(45) Date of Patent: Aug. 9, 2005

(54) VEHICULAR ANTISKID CONTROL APPARATUS AND ANTISKID CONTROL METHOD

(75) Inventors: Toshihisa Nihei, Mishima (JP); Satoshi Udaka, Sunto-gun (JP); Yoshinori Suzuki, Handa (JP); Akifumi Doura, Obu (JP); Yasuhisa Kuwahata, Tokai (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 0 days.

(21) Appl. No.: 10/734,145

(22) Filed: Dec. 15, 2003

(65) Prior Publication Data
US 2004/0128052 A1 Jul. 1, 2004

(30) Foreign Application Priority Data
Dec. 27, 2002 (JP) .......................... 2002-380127

(51) Int. Cl.⁷ .............................. B60T 8/58; B60T 8/62
(52) U.S. Cl. .............................. 701/71; 701/70; 701/75; 701/74
(58) Field of Search ......................... 701/70–71, 72–75, 701/78; 303/190, 192, 117, 152, 139, 163; 180/197; 73/146; B06T 8/58; B60T 8/62, 8/66

(56) References Cited

U.S. PATENT DOCUMENTS

| | | | | |
|---|---|---|---|---|
| 4,439,824 A | * | 3/1984 | Mayer | .......................... 700/30 |
| 5,001,640 A | * | 3/1991 | Matsumoto et al. | .......... 701/77 |
| 5,015,041 A | * | 5/1991 | Kuwana et al. | ............. 303/146 |
| 5,058,018 A | * | 10/1991 | Kuwana et al. | ............... 701/73 |

(Continued)

FOREIGN PATENT DOCUMENTS

| | | | | |
|---|---|---|---|---|
| JP | A 6-144171 | | 5/1994 | |
| JP | 07215195 A | * | 8/1995 | ............. B60T/8/58 |
| JP | 07-301167 | * | 11/1995 | ............. B60T/8/58 |
| JP | 08002397 A | * | 1/1996 | ............. B60T/8/58 |
| JP | 08080823 A | * | 3/1996 | ............. B60T/8/24 |
| JP | H11-357457 | * | 12/1999 | ........... G06F/17/00 |
| JP | 2001-175401 | * | 6/2001 | ............. B60T/8/24 |
| JP | A 2001-310726 | | 11/2001 | |

OTHER PUBLICATIONS

Derwent–Acc–No: 2003–261563, published on Feb. 18, 2003, titled "Antiskid control apparatus for motor vehicle, judges time duration from start of hydraulic pressure reduction process until vehicle speed reaches pseudo speed degree to detect skidding . . . ".*

Derwent–Acc–No: 2000–312560, published on Apr. 4, 2000, titled "Antiskid control apparatus for vehicles, performs antiskid control when removed decelerating component of low frequency region exceeds predetermined threshold value".*

Oikawa et al., Derwent–Acc–No: Motor vehicle split anti-skid brading control appts—includes controller for assessing with reference to threshold values whether or not a vehicle wheel is about to lock based on wheel speeds.*

(Continued)

*Primary Examiner*—Cuong H Nguyen
(74) *Attorney, Agent, or Firm*—Oliff & Berridge, PLC (57) ABSTRACT

If a condition for starting a yaw control during an antiskid control is met while the antiskid control is being executed on one of right and left front wheels during braking on a uneven friction-coeffient road surface, the reference value for making the determination to start the antiskid control on the other one of the front wheels is reduced, and therefore the antiskid control is started at an earlier timing. If the antiskid control is executed on the wheel, the brake pressure of the wheel is controlled in a pre-set specific pattern.

8 Claims, 4 Drawing Sheets

U.S. PATENT DOCUMENTS

| | | | | |
|---|---|---|---|---|
| 5,140,524 A | * | 8/1992 | Matsuda | 701/72 |
| 5,207,483 A | * | 5/1993 | Shimada et al. | 303/148 |
| 5,286,100 A | * | 2/1994 | Takayama et al. | 303/163 |
| 5,328,256 A | * | 7/1994 | Ohta et al. | 303/146 |
| 5,488,557 A | * | 1/1996 | Matsuda | 701/75 |
| 5,752,752 A | * | 5/1998 | Tozu et al. | 303/146 |
| 5,799,261 A | * | 8/1998 | Ozaki et al. | 701/78 |
| 5,826,210 A | * | 10/1998 | Izumi et al. | 701/70 |
| 5,878,365 A | * | 3/1999 | Onogi et al. | 701/70 |
| 5,906,650 A | * | 5/1999 | Tsuno et al. | 701/71 |
| 5,918,953 A | * | 7/1999 | Nihei et al. | 303/190 |
| 6,026,343 A | * | 2/2000 | Ogino | 701/72 |
| 6,078,858 A | * | 6/2000 | Tozu et al. | 701/79 |
| 6,272,417 B1 | * | 8/2001 | Ross et al. | 701/71 |

OTHER PUBLICATIONS

Matsuda, Derwent–Acc–No: 1987–179114, published on Jun. 25, 1987, titled "Antiskid brake control for motor vehicle—has retardation monitors on at least two wheels with processor to compute road speed".*

H. Lieber, Derwent–AA–No: 1984–313986, Dec. 19, 1984, Four–wheel drive vehicle with electronic differential steering—uses wheel–speed sensors and control circuit for regulating braking and engine torque.*

* cited by examiner

VEHICULAR ANTISKID CONTROL APPARATUS AND ANTISKID CONTROL METHOD

INCORPORATION BY REFERENCE

The disclosure of Japanese Patent Application No. 2002-380127 filed on Dec. 27, 2002, including the specification, drawings and abstract, is incorporated herein by reference in its entirety.

BACKGROUND OF THE INVENTION

1. Field of the Invention

The invention relates to braking control apparatus and method for a vehicle and, more particularly, to an antiskid control apparatus and an antiskid control method.

2. Description of the Related Art

A known antiskid control apparatus for a vehicle, such as a motor vehicle or the like, is described in, for example, Japanese Patent Application Laid-Open Publication No. 2001-310726. The apparatus has a construction in which if the antiskid control is executed on one of right and left wheels when the vehicle is running on a so-called uneven friction-coefficient road surface where the road surfaces corresponding to the right and left wheels have different coefficients of friction, a generally-termed yaw control of curbing the increase in the brake pressure of the other one of the wheels and therefore minimizing the difference between the braking forces on the right and left wheels is performed.

According to the above-described antiskid control apparatus, if the antiskid control is executed on one of right and left wheels, the yaw control is executed on the other one of the wheels that is not subjected to the antiskid control, so that the difference between the braking forces on the right and left wheels is minimized. Therefore, the aforementioned antiskid control apparatus is able to reduce the yaw moment that acts on the vehicle due to the difference between the braking forces on the right and left wheels, and to improve the stability of the vehicle, compared with an antiskid control apparatus that does not employ the yaw control.

Generally, in such vehicles as motor vehicles and the like, the antiskid control is performed on the right and left front wheels independently of each other. If the road surface friction coefficients corresponding to the right and left wheels are different from each other, the brake pressures of the right and left wheels at the time of start of the antiskid control are also different from each other. In the antiskid control, the brake pressure is increased and decreased in accordance with the deceleration of the vehicle body. If the vehicle is running on an uneven friction-coefficient road surface, the deceleration of the vehicle body becomes substantially equal to an intermediate value between a vehicle body deceleration estimated from the speed of the wheel on the high-friction coefficient side and a vehicle body deceleration estimated from the speed of the wheel on the low-friction coefficient side. Therefore, if the antiskid control is performed on the high-friction coefficient side wheel as well, the amount of reduction of the brake pressure of the wheel becomes great relative to a value appropriate for the friction coefficient of the road surface. If the vehicle is running on an uneven friction-coefficient road surface, the braking force on the high-friction coefficient side wheels becomes dominant in the braking force on the entire vehicle.

Therefore, if the antiskid control is performed on the high-friction coefficient side wheel as well when the vehicle is running on an uneven friction-coefficient road surface, the braking force on the high-friction coefficient side wheel fluctuates relatively greatly. Therefore, in some cases, a driver needs to perform corrective steering corresponding to fluctuations in the braking forces on the high-friction coefficient side wheel. This problem is particularly remarkable in the case of a vehicle whose behavior is greatly affected by differences between the braking forces on the right and left wheels, for example, a vehicle having a short wheelbase and a high center of gravity.

SUMMARY OF THE INVENTION

It is an object of the invention to reduce fluctuations in the braking forces on a vehicle as a whole and fluctuations in the difference between the braking forces on right and left wheels by reducing the fluctuations in the brake pressure of a high-friction coefficient side wheel in a case where the antiskid control is performed on the high-friction coefficient side wheel as well when the vehicle is running on an uneven friction-coefficient road surface.

A first aspect of the invention relates to a vehicular antiskid control apparatus for reducing a braking slip by controlling a brake pressure of a wheel if the wheel has an excessive braking slip. If road surface friction coefficients corresponding to a right-side wheel and a left-side wheel of a vehicle are different from each other, the vehicular antiskid control apparatus reduces a fluctuation in the brake pressure of a higher-friction coefficient road surface side wheel, of the right-side wheel and the left-side wheel, caused by execution of an antiskid control on that wheel.

According to the first aspect of the invention, if the road surface friction coefficients corresponding to the right and left wheels are different from each other, the fluctuation in the brake pressure of the higher-friction coefficient road surface side wheel caused by execution of the antiskid control on that wheel is reduced. Therefore, when the vehicle is running on an uneven friction-coefficient road surface, if the antiskid control is executed on the higher-friction coefficient road surface side wheel as well, the fluctuation thereby caused in the braking force on the higher-friction coefficient road surface side wheel can be reduced. Hence, fluctuations in the braking force on the vehicle as a whole and fluctuations in the braking force difference between the right and left wheels can be reduced. As a result, the apparatus reliably reduces the need for the correction steering that is performed by a driver corresponding to fluctuations in the braking force on a higher-friction coefficient road surface side wheel.

A second aspect of the invention relates to a vehicular antiskid control method of reducing a braking slip by controlling a brake pressure of a wheel if the wheel has an excessive braking slip. This method includes the step of determining whether road surface friction coefficients corresponding to a right-side wheel and a left-side wheel are different from each other, and the step of reducing a fluctuation in the brake pressure of a higher-friction coefficient road surface side wheel, of the right-side wheel and the left-side wheel, caused by execution of the antiskid control on that wheel if it is determined that road surface friction coefficients corresponding to the right-side wheel and the left-side wheel are different from each other.

As explained above in conjunction with the first aspect of the invention, fluctuations in the braking force on the vehicle as a whole and fluctuations in the braking force difference between the right and left wheels can be reduced. Thus, the method reliably reduces the need for the correction steering that is performed by a driver corresponding to fluctuations in the braking force on the higher-friction coefficient road surface side wheel.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Preferred embodiments of the invention will be described hereinafter with reference to the accompanying drawings.

Figure 1:
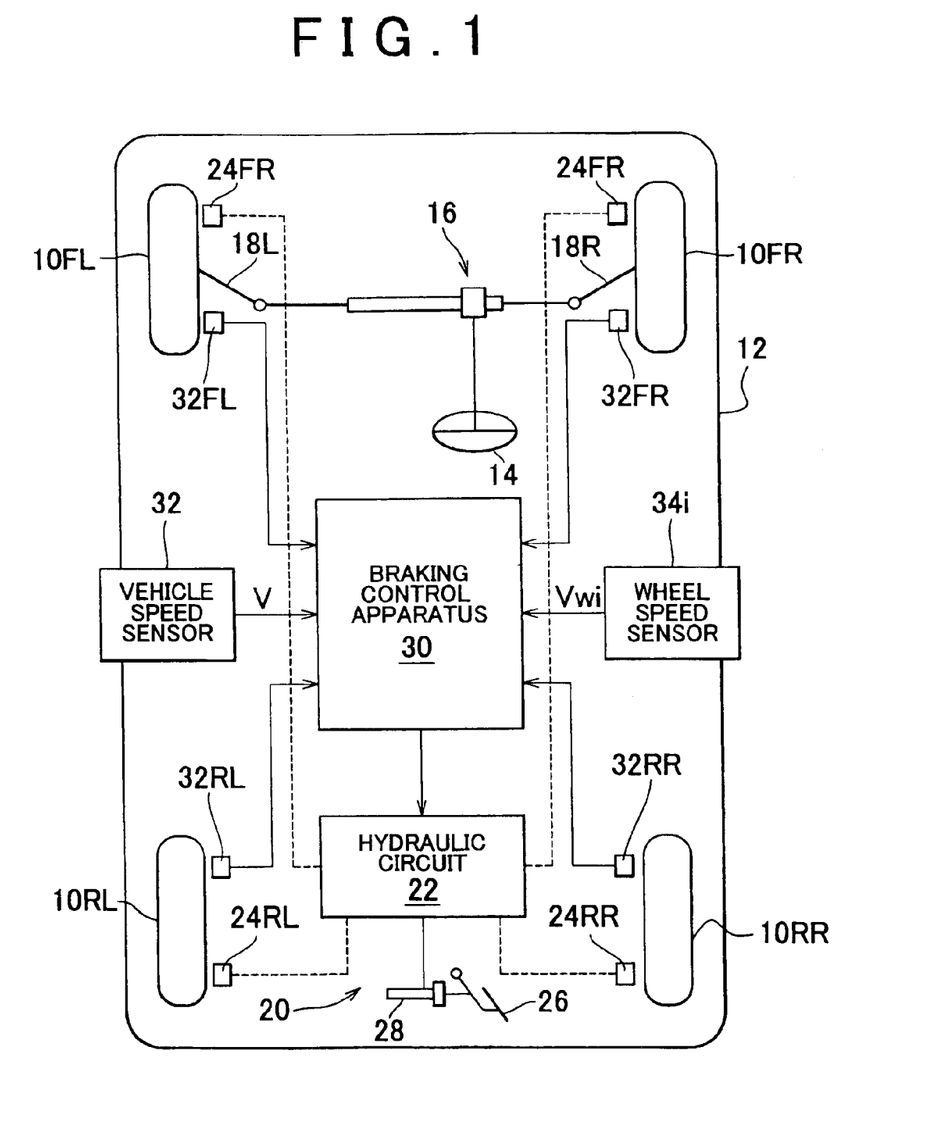
FIG. 1 is a schematic diagram illustrating an embodiment of the vehicular antiskid control apparatus of the invention.

FIG. 1 is a schematic diagram illustrating an embodiment of the vehicular antiskid control apparatus of the invention.

Front left and right tire wheels 10FL, 10FR, that is, steer tire wheels, are steered via tie rods 18L, 18R by a rack-and-pinion power steering apparatus 16 that is actuated in response to the turning of a steering wheel 14 performed by a driver.

The braking forces on the wheels are controlled through control of the brake pressures on wheel cylinders 24FR, 24FL, 24RR, 24RL accomplished by a hydraulic circuit 22 of a braking apparatus 20. Although not shown in FIG. 1, the hydraulic circuit 22 includes an oil reservoir, an oil pump, various valve devices, etc. The brake pressure of each wheel cylinder is normally controlled by a master cylinder 28 that is actuated in accordance with a depressing operation of a brake pedal 26 performed by a driver and, if necessary, is controlled by a braking control apparatus 30 as described below.

The braking control apparatus 30 inputs a signal indicating a vehicle speed V from a vehicle speed sensor 32, and also inputs signals indicating wheel speeds Vwi (i=fl, fr, rl, rr) of the front left, front right, rear left and rear right wheels from wheel speed sensors 34i (i=fl, fr, rl, rr). Although FIG. 1 shows only one wheel speed sensor 34i, wheel speed sensors are provided for the individual wheels in an actual arrangement. Although not indicated in FIG. 1, the braking control apparatus 30 includes a microcomputer of an ordinary construction that has, for example, a CPU, a ROM, a RAM, an input/output port device that are interconnected by a bidirectional common bus.

The braking control apparatus 30 estimates a vehicle body speed Vb from the wheel speeds Vwi as described below in a fashion known in the art, following a flowchart shown in FIG. 2. Then, the braking control apparatus 30 computes an amount of braking slip SLi (i=fl, fr, ri, rr) of each wheel as the difference between the wheel speed Vwi and the estimated vehicle body speed Vb. If the estimated vehicle body speed Vb is greater than or equal to a control start threshold Vbs for starting the antiskid control (positive constant) and the braking slip amount SLi is greater than or equal to a pre-set threshold value $SL_O$, the braking control apparatus 30 executes an antiskid control (simply termed "ABS control" in the drawings) for reducing the braking slip amount through a control of increasing or decreasing the brake pressure of the wheel.

Figure 2:
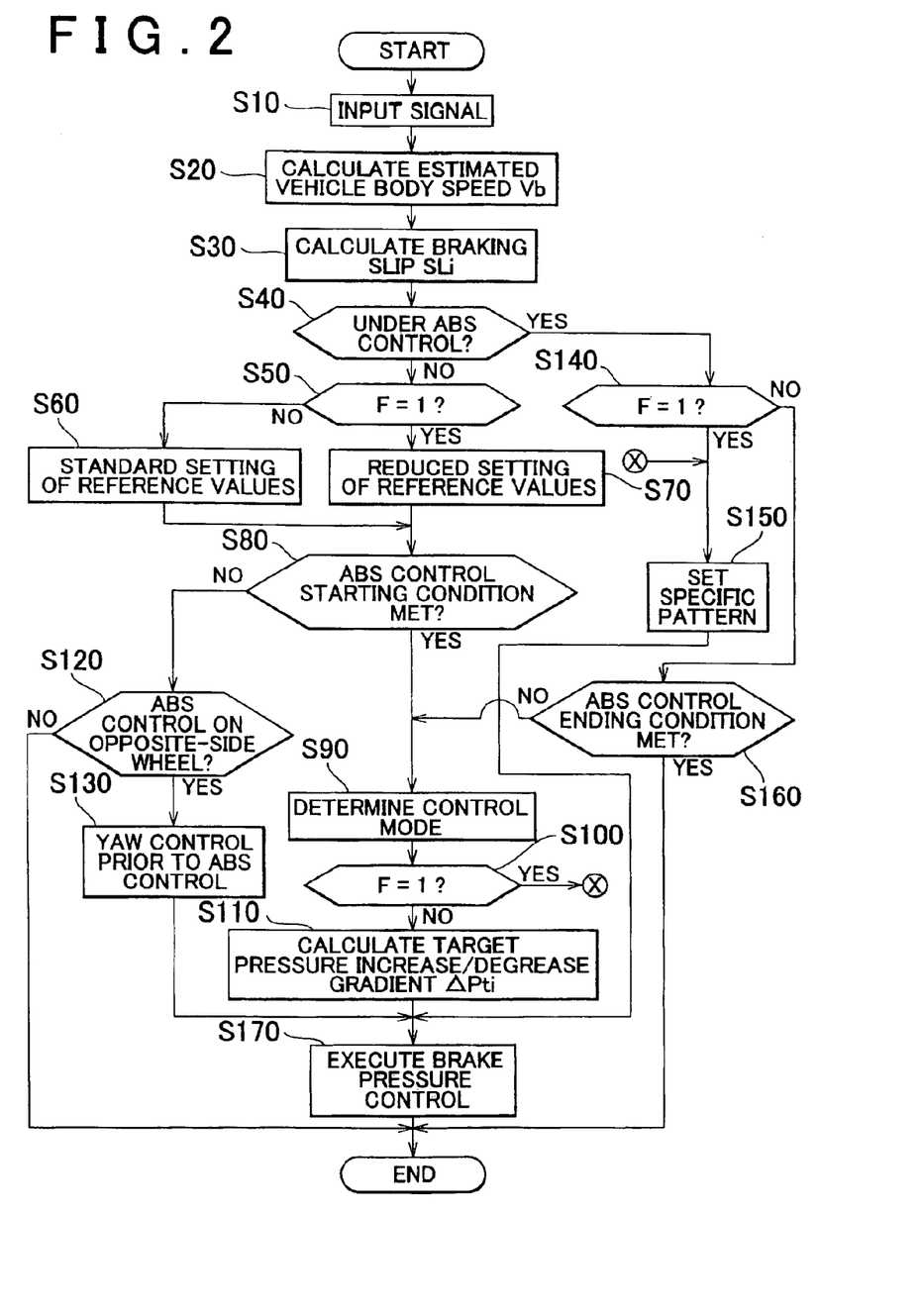
FIG. 2 is a flowchart illustrating an antiskid control routine in the embodiment shown in FIG. 1.
Figure 3:
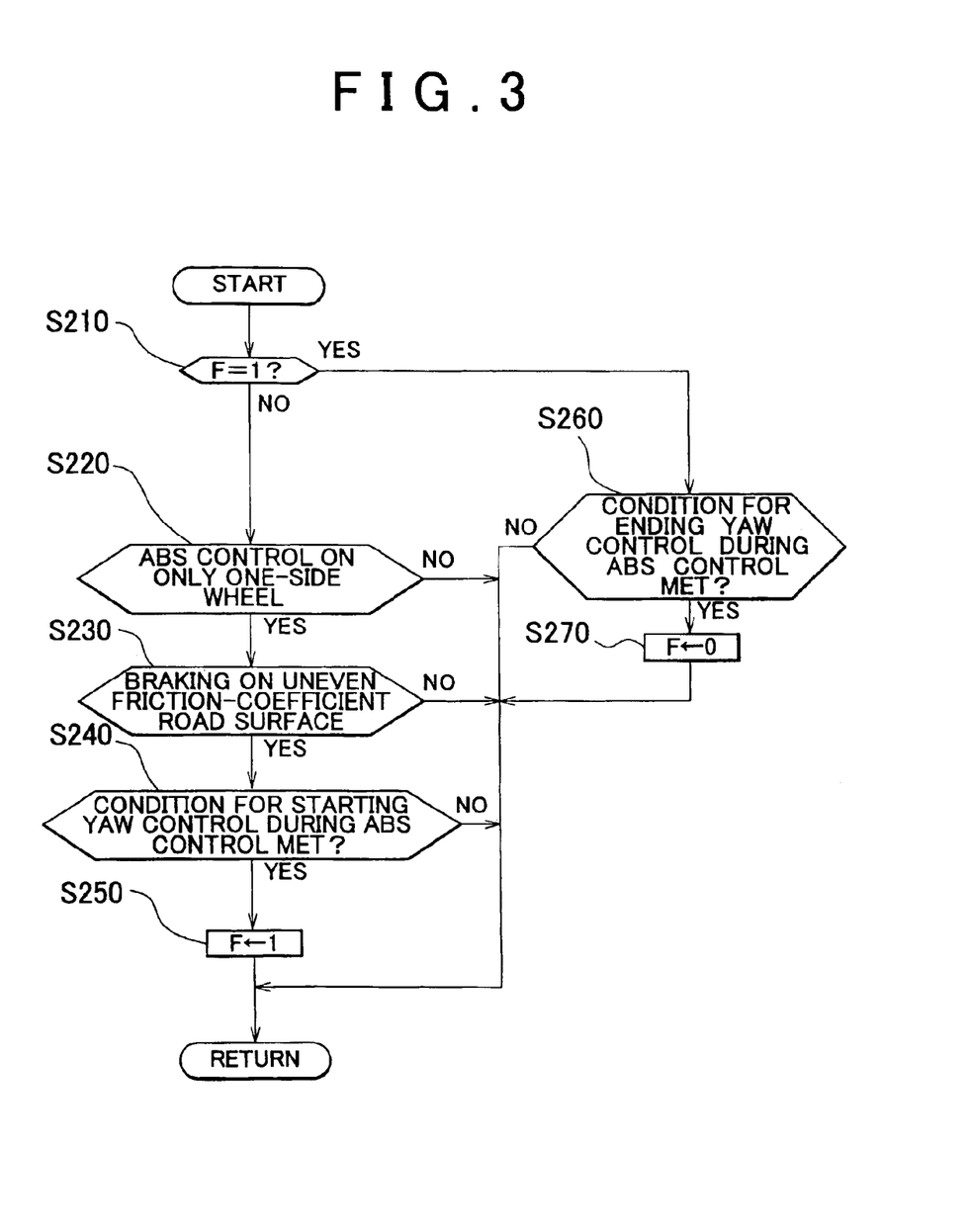
FIG. 3 is a flowchart illustrating an uneven friction-coefficient road braking control routine in the embodiment shown in FIG. 1.

If while the antiskid control is being executed on a first one of the front wheels 10FL, 10FR during the braking of the vehicle on an uneven friction-coefficient road surface the antiskid control is executed on a second one of right and left front wheels 10FL, 10FR, the braking control apparatus 30 executes a yaw control with respect to the brake pressure of the second front wheel during the antiskid control so as to reduce fluctuations of the braking force on the second front wheel, following the flowchart illustrated in FIGS. 2 and 3. Therefore, the increases and decreases in the brake pressure of the second front wheel will be reduced.

In the embodiment shown in FIG. 1, the yaw control during the antiskid control (herein refereed to as "an in-antiskid control yaw control") is accomplished by (1) reducing a reference value for determining whether to start the antiskid control on the second front wheel, and (2) increasing and decreasing the brake pressure in accordance with a pre-set specific pattern so as to reduce the amount of increase or decrease in the brake pressure of the second front wheel when the antiskid control is executed on the second front wheel. According to a braking state of the second controller, one of the amount of increase and the amount of decrease may be reduced or both of the amount of increase and the amount of decrease may be reduced.

As indicated in FIG. 2, if the vehicle is braking on an uneven friction-coefficient road surface and the antiskid control is being executed only on a first one of the left and right front wheels 10FL, 10FR, the braking control apparatus 30 executes a conventional yaw control of limiting the increase in the brake pressure of the second one of the front wheels, that is, one of the left and right front wheels that is not subjected to the antiskid control, (the yaw control prior to the antiskid control), so as to prevent a great difference between the braking forces on the left and right front wheels and therefore prevent an excessive yaw moment on the vehicle.

Next, the antiskid control in accordance with the embodiment will be described with reference to the flowchart shown in FIG. 2. The control illustrated by the flowchart shown in FIG. 2 is started upon the turning-on of an ignition switch (not shown), and is cyclically executed on the individual wheels in the sequence of, for example, the front left wheel and the front right wheel, at predetermined time intervals. As for the rear right and left wheels, the antiskid control may be executed in an arbitrary fashion known in the art.

First, in step 10, signals indicating the wheel speeds Vwi detected by the wheel speed sensors 32FR to 32RL and the like are input. In step 20, an estimated vehicle body speed Vb is computed in the following fashion. First, among the wheel speeds Vwi of the individual wheels, the value considered to be the closest to the actual vehicle body speed is selected as an estimated vehicle body speed Vwb. An estimated vehicle body speed Vb1 for curbing the rate of increase of the estimated vehicle body speed and an estimated vehicle body speed Vb2 for curbing the rate of decrease of the estimated vehicle body speed are calculated as in the following equations 1 and 2. In the equations, Vbf is the previous estimated vehicle body speed, and α is a positive constant. An intermediate value among the esti mated vehicle body speeds Vwb, Vb1, Vb2 is calculated as a present estimated vehicle body speed Vb.

$$Vb1 = Vbf - \alpha \quad (1)$$

$$Vb2 = Vbf + \alpha \quad (2)$$

In step 30, a braking slip amount SLi (i=fl or fr) of the wheel that is controlled during the present execution of the routine (herein referred to as "a present control-object wheel") is calculated as a deference between the wheel speed Vwi of the present control-object wheel and the estimated vehicle body speed Vb. Subsequently in step 40, it is determined whether the antiskid control is being executed on the present control-object wheel. If an affirmative determination is made, the process proceeds to step 140. If a negative determination is made in step 40, the process proceeds to step 50.

In step 50, it is determined whether a flag F set by a routine illustrated in FIG. 3 is "1", that is, whether it is necessary to execute braking force control on the front wheel that is not subjected to the antiskid control, when running on an uneven friction-coefficient road surface. If a negative determination is made in step 50, the process proceeds to step 60. If an affirmative determination is made in step 50, the process proceeds to step 70.

In step 60, reference values Vbs, $SL_O$ for determination in step 80 as to whether a condition for starting the antiskid control is met are set at standard values (positive values). In step 70, the reference values Vbs, $SL_O$ are reduced and set at values (positive values) that are less than the standard values. The degree of reduction of the reference values Vbs, $SL_O$ is set greater as the vehicle speed V increases.

In step 80, it is determined whether the condition for starting the antiskid control with respect to the present control-object wheel, for example, whether the estimated vehicle body speed Vb is greater than or equal to a control start reference value Vbs and the braking slip amount SLi of the present control-object wheel is greater than or equal to the reference value $SL_O$. If a negative determination is made in step 80, the process proceeds to step 120. If an affirmative determination is made in step 80, the process proceeds to step 90.

In step 90, the mode of control is set to one of a pressure increase mode, a hold mode and a pressure decrease mode on the basis of, for example, the braking slip amount SLi of the present control-object wheel and a wheel acceleration calculated through time differentiation of the wheel speed Vwi of the present control-object wheel, in a fashion known in the art.

In step 100, it is determined whether the flag F is "1", as in step 50. If an affirmative determination is made in step 100, the process proceeds to step 150. If a negative determination is made in step 100, the process proceeds to step 110, in which a target increase/decrease gradient ΔPti (i=fl or fr) for a braking pressure of the present control-object wheel is calculated, for example, on the basis of the braking slip amount SLi of the present control-object wheel, the control mode determined in step 90, and the deceleration of the vehicle estimated from the wheel acceleration of each wheel in a fashion known in the filed of technology.

In step 120, it is determined whether the antiskid control is being executed on the front wheel that is not a control object in the present execution of the routine. A negative determination made in step 120 is immediately followed by a temporary end of the control based on the routine illustrated in FIG. 2. An affirmative determination made in step 120 is followed by a continuation onto step 130 in which a yaw control prior to the antiskid control in which the pressure increase for the present control-object wheel is curbed in a fashion known in the art, for example, is executed (in this yaw control, a target increase/decrease gradient ΔPti is calculated).

Figure 4:
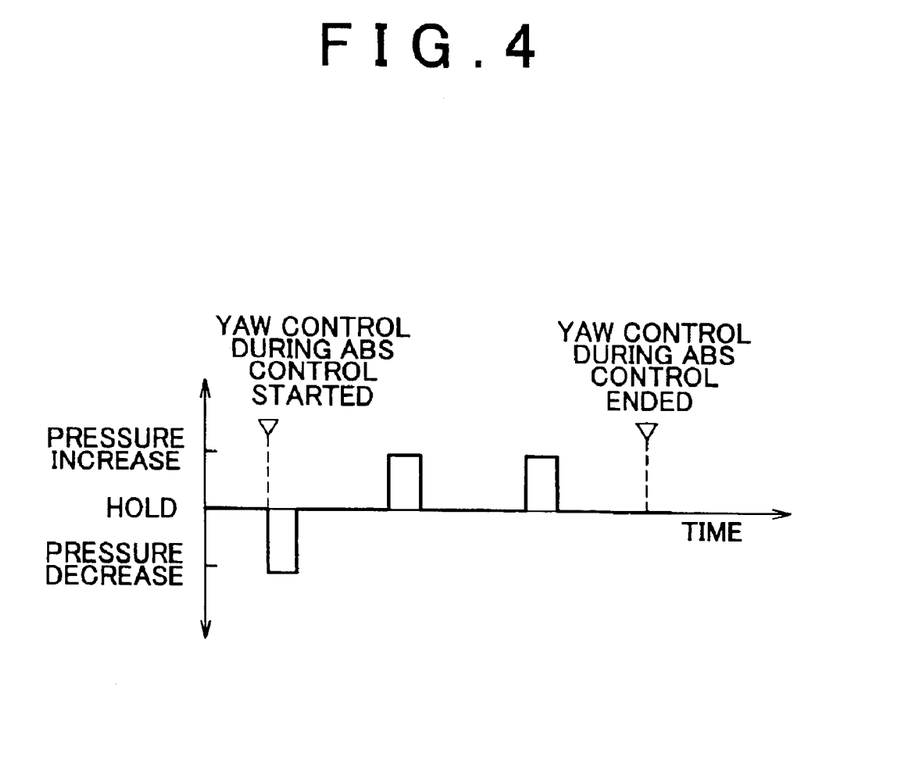
FIG. 4 is a diagram indicating a specific pattern set for an in-antiskid control yaw control.

In step 140, it is determined whether the flag F is "1", as in steps 50 and 100. If a negative determination is made in step 140, the process proceeds to step 160. If an affirmative determination is made in step 140, the mode of control is set to one of the pressure increase mode, the hold mode and the pressure decrease mode in step 150 in substantially the same fashion as in step 90. Furthermore, in accordance with the set mode of control, the pressure increase/decrease pattern of the present control-object wheel is set to a specific pattern pre-set for the an in-antiskid control yaw control as indicated in FIG. 4.

Subsequently in step 160, it is determined whether a condition for ending the antiskid control is met with regard to the present control-object wheel. An affirmative determination in this step is immediately followed by a temporary end of the control based on the routine illustrated in FIG. 2. If a negative determination is made in step 160, the process proceeds to step 90. It is appropriate to determine that the condition for ending antiskid control is met if (1) a braking operation performed by a driver or a braking operation performed by an automatic braking control apparatus has ended or (2) a condition that the estimated vehicle body speed Vb is less than or equal to a control end threshold value Vbf for ending the antiskid control (positive constant) is met.

In step 170, the brake pressure of the present control-object wheel is controlled so as to change in an increase/decrease pattern corresponding to a specific pattern set in step 150 or a target pressure increase/decrease gradient ΔPti calculated in step 110 or 130, through a duty-ratio control of a pressure increase/decrease control valve of the present control-object wheel in accordance with the specific pattern or the target pressure increase/decrease gradient ΔPti.

With reference to the flowchart shown in FIG. 3, an uneven friction-coefficient road braking control of the embodiment shown in FIG. 1 will be described. The control based on the flowchart shown in FIG. 3 is also started upon the turning-on of the ignition switch (not shown), and is cyclically executed at every predetermined time.

First in step 210, it is determined whether the flag F is "1" as in steps 50, 100 and 140. An affirmative determination in step 210 is followed by step 260. A negative determination in step 210 is followed by step 220.

In step 220, it is determined whether the antiskid control is being executed on only one of the right and left front wheels. A negative determination in step 220 is immediately followed by a temporary end of the control based on the routine illustrated in FIG. 3. An affirmative determination in step 220 is followed by step 230.

In step 230, it is determined whether the vehicle is braking on an uneven friction-coefficient road surface. A negative determination in step 230 is immediately followed by a temporary end of the control based on the routine illustrated in FIG. 3. Conversely, an affirmative determination in step 230 is followed by step 240. Whether the vehicle is braking on an uneven friction-coefficient road may be determined in an arbitrary fashion known in the art. For example, this determination may be based on, for example, the determination as to whether a difference between a difference ΔTL between the pressure increase time and the pressure decrease time of the brake pressure of the left front wheel and a difference ΔTR between the pressure increase time and the pressure decrease time of the brake pressure of the right front wheel is greater than or equal to a reference value.

In step 240, it is determined whether a condition for starting the in-antiskid control yaw control is met. A negative determination in step 240 is immediately followed by a temporary end of the routine illustrated in FIG. 3. An affirmative determination in step 240 is followed by step 250, in which the flag F is set to "1". The determination as to whether the condition for starting the in-antiskid control yaw control is met may be made on the basis of the determination as to whether, for example, all the following conditions are met: (1) the braking on the present control-object wheel is increasing; (2) the wheel speed Vwi of the present control-object wheel is less than Vb−(VbKa+Kb) where Ka and Kb are positive constants; and (3) the derivative value dVwi of the wheel speed Vwi of the present control-object wheel is less than Kc that is a positive coefficient that increases with increases in the estimated vehicle body speed Vb.

In step 260, it is determined whether a condition for ending the in-antiskid control yaw control is met. A negative determination in step 260 is immediately followed by a temporary end of the routine illustrated in FIG. 3. An affirmative determination in step 260 is followed by step 270, in which the flag F is reset to "0". The determination as to whether the condition for ending the in-antiskid control yaw control is met may be made on the basis of the determination as to whether, for example, any one of the following conditions is met: (1) the brake pressure increase/decrease control on the present control-object wheel in a specific pattern described below is finished; (2) the brake pressure of the present control-object wheel is the pressure decrease mode; and (3) the estimated vehicle body speed Vb is less than a reference value.

According to the embodiment shown in the drawings, an estimated vehicle body speed Vb is calculated in step 20, and a braking slip amount SLi is calculated in step 30. If the braking slip of the present control-object wheel is excessively great, negative determinations are made in steps 40 and 50. Subsequently, the reference values Vbs and $SL_O$ for making a determination to start the antiskid control are set at standard values in step 60. If an affirmative determination is made in step 80, steps 90, 110 and 170 are executed, whereby the braking slip of the present control-object wheel is reduced by the antiskid control.

In a situation where the vehicle is braking on an uneven friction-coefficient road surface and where the amount of braking slip SLi of the present control-object wheel is not excessively great but the antiskid control is being executed on the front wheel that is not the control object during the present execution of the routine (the front wheel on a low-friction coefficient road surface side), a negative determination is made in step 80 in the flowchart shown in FIG. 2, and an affirmative determination is made in step 120 in the flowchart. After that, in step 130, the known pre-antiskid control yaw control is performed on the present control-object wheel (wheel on a high-friction coefficient road surface side) so as to curb the increase in the braking force on the present control-object wheel. This operation prevents an excessive yaw moment on the wheels due to the braking force difference between the right and left front wheels.

In a situation where the vehicle is braking on an uneven friction-coefficient road surface and where the amount of braking slip SLi of the present control-object wheel is not excessively great but the antiskid control is being executed on the front wheel that is not the control-object during the present execution of the routine (the wheel on a low-friction coefficient road surface side), if the condition for starting the in-antiskid control yaw control is met with regard to the present control-object wheel, an affirmative determination is made in step 240 in the flowchart shown in FIG. 3, and the flag F is set to "1" in step 250. Hence, an affirmative determination is made in step 50, and the reference values Vbs and $SL_O$ for making the determination to start the antiskid control are set at values that are lower than the standard values. After that, the process of step 80 onward is executed.

According to the embodiment illustrated in the drawings, if the vehicle is braking on an uneven friction-coefficient road and one of the right and left front wheels is subjected to the antiskid control, the antiskid control can be started early on the wheel on the high-friction coefficient road surface side. Therefore, it becomes possible to reliably reduce the width of increase or decrease of the brake pressure associated with a reduction in the brake pressure due to a start of the antiskid control after the brake pressure of the wheel on the high-friction coefficient road surface side has become high.

Furthermore, according to the embodiment illustrated in the drawings, if the antiskid control is started in a situation where the reference values Vbs and $SL_O$ for making the determination to start of the antiskid control have been set at values that are lower than the standard values in step 70, affirmative determinations are made in steps 40 and 140. Subsequently in step 150, the brake pressure of the control-object wheel in the present execution of the routine is controlled in a specific pattern pre-set for the in-antiskid control yaw control. This operation effectively prevents excessive increases of the braking force difference between the right and left front wheels and the braking slip of the control-object wheel, and therefore reliably prevents great fluctuations of the brake pressure of the wheel on the high-friction coefficient road surface side during execution of the antiskid control on the present control-object wheel.

According to the embodiment illustrated in the drawings, the degrees of reduction of the reference values Vbs and $SL_O$ for making the determination to start the antiskid control are set higher as the vehicle speed V becomes higher. Therefore, the antiskid control on the wheel of the high-friction coefficient road surface side can be started earlier as the vehicle speed becomes higher. Therefore, in comparison with the case where the degrees of reduction in the reference values are constant, the antiskid control can be properly performed on a wheel on the high-friction coefficient road surface side in accordance with the condition of the vehicle.

According to the embodiment illustrated in the drawings, the determination in step 240 is carried out in addition to the determinations in steps 220 and 230. Therefore, in comparison with the case where affirmative determinations in steps 220 and 230 are followed by the setting of the flag F to "1" without intervention of the determination in step 240, the possibility of unnecessary execution of the in-antiskid control yaw control on one of the right and left front wheel that is opposite from the front wheel subjected to the antiskid control can be effectively reduced.

While the invention has been described with reference to what are presently considered to be preferred embodiments thereof, it should be apparent to the persons skilled in the art that the invention is not limited to the disclosed embodiments or constructions, but that various modifications and equivalent arrangements can be made within the scope of the invention.

For example, in the foregoing embodiments, the degrees of reduction in the reference values Vbs and $SL_O$ for making the determination to start the antiskid control may be set higher as the vehicle speed V increases. However, the degrees of reduction in the reference values Vbs, $SL_O$ may be corrected so as to vary on the basis of the vehicle speed V or other parameters. It is also possible to fix the degree of reduction in at least one of the reference values.

Furthermore, in the foregoing embodiment, if affirmative determinations are made in all of steps 220 to 240, the flag F is set to "1" and the in-antiskid control yaw control is executed on the high-friction coefficient road surface side front wheel. However, the determination in step 240 may be omitted.

What is claimed is:

1. A vehicular antiskid control apparatus comprising:
    a first controller configured to determine whether road surface friction coefficients corresponding to a right-side wheel and a left-side wheel of a vehicle are different from each other; and
    a second controller configured to reduce a fluctuation in a brake pressure of a higher-friction coefficient road surface side wheel, of the right-side wheel and the left-side wheel, caused by execution of an antiskid control state on that wheel if it is determined by the first controller that the road surface friction coefficients corresponding to the right-side wheel and the left-side wheel are different from each other, wherein during execution of the antiskid control state on a lower-friction coefficient road surface side wheel of the right-side wheel and the left-side wheel, the second controller reduces a threshold reference value from a standard braking slip amount to a reduced braking slip amount for determining to start the antiskid control state on the higher-friction coefficient road surface side wheel.

2. The vehicular antiskid control apparatus according to claim 1, wherein the right-side wheel and the left-side wheel are front wheels of the vehicle.

3. The vehicular antiskid control apparatus according to claim 1, wherein the second controller increases a degree of reduction of the reference value for making the determination to start the antiskid control on the higher-friction coefficient road surface side wheel as a vehicle speed increases.

4. The vehicular antiskid control apparatus according to claim 1, wherein the second controller reduces at least one of an amount of increase and an amount of decrease in the brake pressure caused by the antiskid control executed on the higher-friction coefficient road surface side wheel.

5. The vehicular antiskid control apparatus according to claim 4, wherein the second controller controls the brake pressure of the higher-fiction coefficient road surface side wheel in a pre-set specific pressure increase/decrease pattern so that at least one of the amount of increase and the amount of decrease in the brake pressure caused by the antiskid control is reduced.

6. The vehicular antiskid control apparatus according to claim 1, wherein if the antiskid control is being executed on a lower-friction coefficient road surface side wheel, of the right-side wheel and the left-side wheel, and a condition for starting an in-antiskid control yaw control on a higher-friction coefficient road surface side wheel is met, the second controller reduces the fluctuation in the brake pressure of the higher-friction coefficient road surface side wheel.

7. The vehicular antiskid control apparatus according claim 1, wherein if a difference between a brake pressure increase/decrease time of the right-side wheel and a brake pressure increase/decrease time of the left-side wheel is greater than or equal to a reference value while the antiskid control is being executed on one of the right-side wheel and the left-side wheel, the first controller determines that the road surface friction coefficients corresponding to the right-side wheel and the left-side wheel are different from each other.

8. A vehicular antiskid control method comprising:
    determining whether road surface friction coefficients corresponding to a right-side wheel and a left-side wheel are different from each other; and
    reducing a fluctuation in the brake pressure of a higher-friction coefficient road surface side wheel, of the right-side wheel and the left-side wheel, caused by execution of an antiskid control state on that wheel if it is determined that road surface friction coefficients corresponding to the right-side wheel and the left-side wheel are different from each other, wherein during execution of the antiskid control state on a lower-friction coefficient road surface side wheel of the right-side wheel and the left-side wheel, the second controller reduces a threshold reference value from a standard braking slip amount to a reduced braking slip amount for determining to start the antiskid control state on the higher-friction coefficient road surface side wheel.

* * * * *